INVENTOR.
HAROLD M. RICHARDSON
BY
Hudson & Young
ATTORNEYS

United States Patent Office 2,731,520
Patented Jan. 17, 1956

2,731,520

PULSE-AMPLITUDE MEASURING CIRCUIT COMPENSATED FOR VARYING FREQUENCY

Harold M. Richardson, Bartlesville, Okla., assignor to Phillips Petroleum Company, a corporation of Delaware Application March 10, 1952, Serial No. 275,739

2 Claims. (Cl. 179—171)

This invention relates to a circuit for measuring the amplitude of pulses. In another aspect, it relates to a detonation meter of improved construction.

In Patent 2,534,004 to D. R. de Boisblanc, entitled Detonation Voltage Measuring Means, there is disclosed an instrument for measuring detonation or, more broadly, the amplitude of electrical pulses, in which a pick up converts the pressure variations in a cylinder of an internal combustion engine into electrical voltages representative thereof. After suitable transformation, the electrical output of the pick up is converted, in one channel, into pulse whose amplitude varies in accordance with the intensity of detonations and whose frequency is dependent upon the frequency of detonation. In a second channel, a direct voltage is produced which is proportional to the frequency of occurrence of the pulses. This direct voltage is used to regulate the gain of a tube in the first channel so as to eliminate the effect of pulse or detonation frequency from the reading of the instrument. The output of the instrument is, therefore, a function of the amplitude of detonation but is independent of the frequency at which the detonations occur.

I have discovered that the operation of this circuit can be improved and several elements of the combination eliminated by utilizing a remote cut off variable gain tube in the amplifier having a plurality of grids, this tube being operated at a portion of its characteristic wherein the gain or amplification factor is inversely proportional to the negative bias applied to the control grid. A direct bias voltage is produced and applied to the control grid which is proportional to the frequency of occurrence of the pulses. Thus, the input to the tube is a function of $na$, the product of the number of pulses per second, i. e., frequency, and the amplitude of the pulses. The gain of the tube is proportional to $1/n$ so that the output signal is responsive only to the amplitude of the pulses, and not to their frequency. Also, in connection with the described circuit, I have found it desirable to incorporate a visual indicator which is responsive to each detonation, as by producing a flash of light each time a detonation occurs. This is particularly useful where the test engine is so operated that detonation occurs at relatively infrequent intervals.

Although I have discussed the improvements in connection with an instrument for measuring detonation, it will be evident as the description proceeds that the circuits and principles of the invention are also applicable generally to pulse-measuring instruments wherein the pulses to be measured vary both in frequency and in amplitude.

Accordingly, it is an object of the invention to provide an improved pulse-measuring instrument.

It is a still further object to provide a detonation meter of improved construction.

It is a still further object to provide an instrument which is reliable in operation, economical in construction, and which utilizes a minimum number of standard circuit components.

Various other objects, advantages and features of the invention will become apparent from the following detailed description taken in conjunction with the accompanying drawings, in which.

Figure 1:
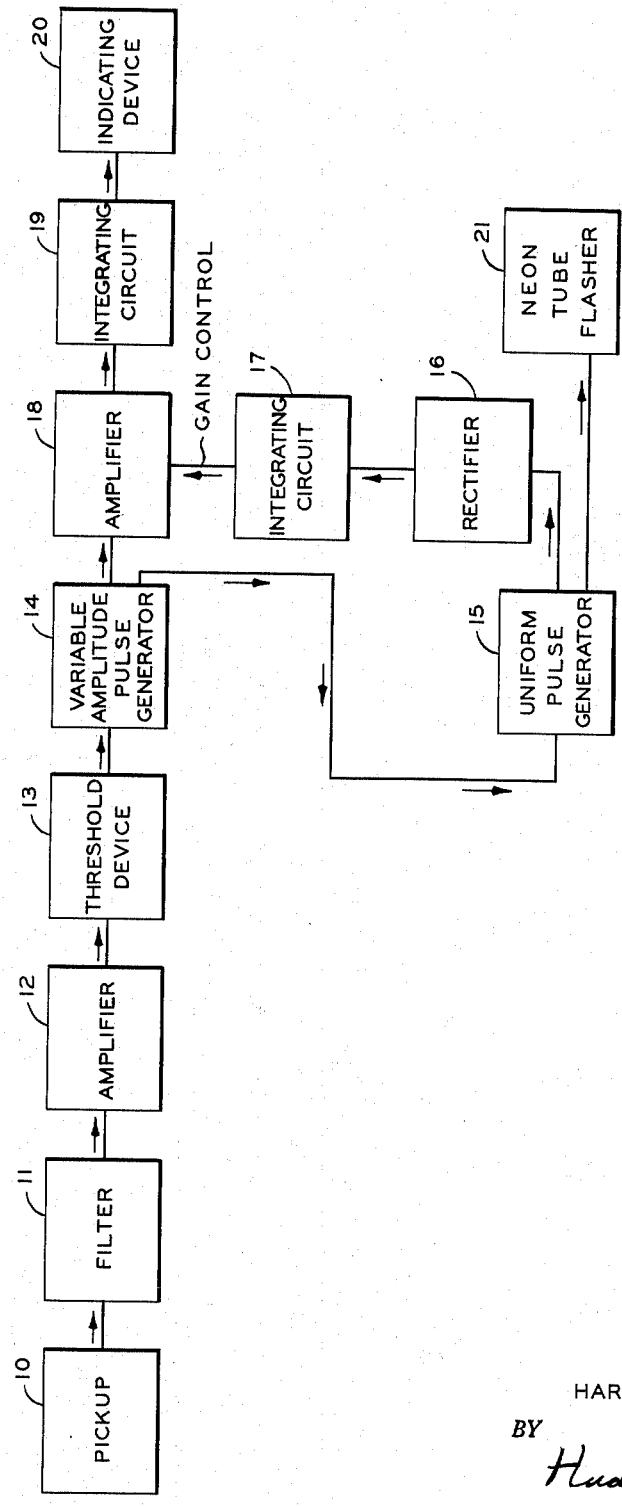
Figure 1 is a block diagram of the pulse-measuring instrument.

Referring now to Figure 1, I have shown a pick up 10 which produces an electrical output representative of the rate of change of pressure in a cylinder of an internal combustion engine, such as a test engine. The signal from pick up 10 is passed to a filter 11 wherein undesirable components representative of valve clatter, ignition and other extraneous disturbances are reduced. In a preferred embodiment of the invention, filter 11 is a band pass filter tuned to approximately 6500 cycles per second, at which frequency there is a characteristic band of strong components representative of detonation. Band pass filters tuned to other frequencies can be used where desirable or, alternatively, filter 11 can be of the high cut or low cut type. The filtered signals are passed to an amplifier 12 and, thence, to a threshold device 13. This device incorporates a biased electron tube which is so adjusted as to pass only signals of greater than a predetermined magnitude. When the bias is properly regulated, the output consists of sharp pulses whose amplitude is a function of the detonation intensity. The threshold device eliminates any low frequency components or other undesirable noise voltages not removed in filter 11.

The pulses from threshold device 13 pass to a variable amplitude pulse generator 14 in which the sharp pulses produced by the threshold device are transformed into exponential pulses, thereby increasing the energy represented by each pulse. The output of generator 14 is fed to two channels.

In one channel, the signals are fed to a uniform pulse generator 15. This unit produces a pulse of constant amplitude and width each time an exponential pulse appears at the output of generator 14. The uniform pulses are fed to a rectifier 16 and, thence, to an integrating circuit 17. In this manner, the uniform pulses are transformed into a steady negative bias voltage, the magnitude of which is proportional to the frequency of the pulses appearing at the output of generator 14.

Signals from generator 14 are also fed to an amplifier 18 incorporating a variable gain tube, the amplification factor of which is controlled by the bias voltage produced by integrating circuit 17. The gain of this tube is inversely proportional to the frequency of the pulses to be amplified and, therefore, the effect of the pulse frequency upon the output signal of amplifier 18 is eliminated. Accordingly, this output signal is representative only of the amplitude of the exponential pulses fed thereto from generator 14.

The output signal from amplifier 18 is fed to an integrating circuit 19 and, thence, to an indicating device 20. The integrating action of circuit 19 produces a steady voltage at indicating device 20 which is representative of the average amplitude of the detonation pulses but independent of their frequency.

The uniform pulses produced by generator 15 are fed to and actuate a visual indicating device 21 which, preferably, is a neon tube flasher producing a flash of illumination each time a pulse is fed thereto from generator 15.

Figure 2:
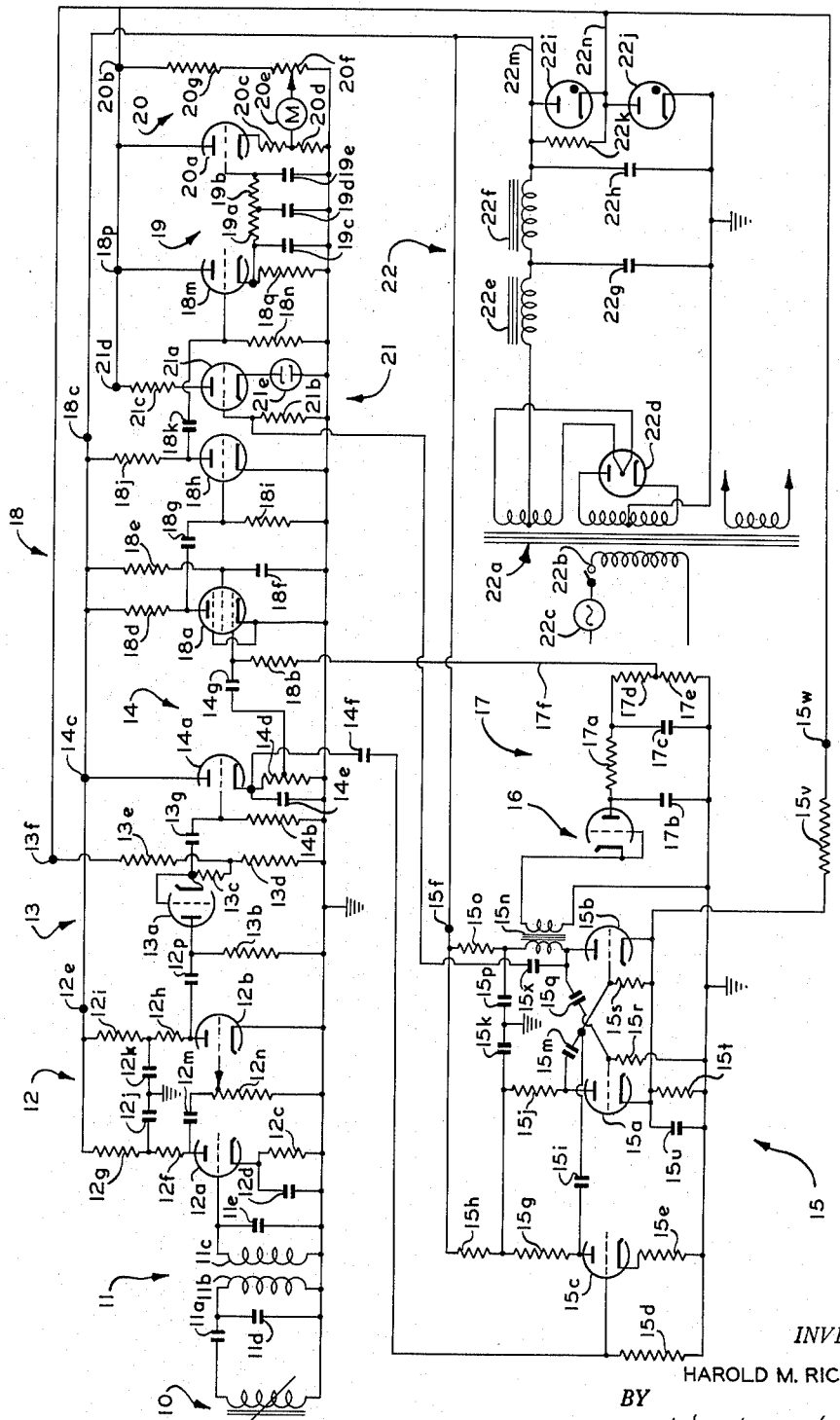
Figure 2 is a schematic circuit diagram of the instrument shown in block diagram of Figure 1.

The detailed manner of operation of the improved circuit will become more apparent from a consideration of the schematic circuit diagram of Figure 2. Referring now to this figure, I have indicated the pick up 10 as being of the variable reluctance type, this unit preferably incorporating a coil wound upon a magnetostrictive rod which is responsive to movement of a diaphragm communicating with the interior of the cylinder under test. A suitable pick up is shown in U. S. Patent 2,269,760 to Kenneth R. Eldredge, entitled Detonation Indicator. This pick up produces a voltage representative of the rate of change of pressure in the engine cylinder, and components are present in this voltage which are representative of unwanted disturbances, such as valve clatter, the ignition spark, and the low frequence pressure wave produced by normal combustion of fuel in the cylinder.

In filter 11, most of these unwanted components are reduced since the filter is tuned to a frequency of which the detonation components are of considerable greater amplitude than the extraneous components. To this end, filter 11 can include a coupling condenser 11a and a pair of inductively coupled windings 11b and 11c, the windings being shunted by the respective condensers 11d and 11e.

The filtered signals pass to the amplifier 12 which includes two triodes 12a and 12b connected in cascade, the filtered signal being impressed upon the control grid of tube 12a. The cathode of tube 12a is connected to ground through a bias resistor 12c shunted by a by pass condenser 12d while the cathode of tube 12b is connected directly to ground. The anodes of tubes 12a, 12b are connected to a positive power supply terminal 12e by the respective sets 12f, 12g and 12h, 12i of voltage dropping resistors, the junctions between these sets of resistors being grounded through the respective by pass condensers 12j and 12k. The anode of tube 12a is also connected through a coupling condenser 12m to one fixed terminal of a potentiometer 12n, the other fixed terminal of which is grounded. The contactor of potentiometer 12n is connected to the control grid of triode 12b and the anode of this tube is connected through a coupling condenser 12p to the threshold circuit 13. It will be evident that the unit 12 amplifies the filtered signals fed to the control grid of tube 12a and that the gain of the amplifier can be regulated by potentiometer 12n.

The threshold device 13 includes a biased rectifier tube 13a, the anode of which is connected to coupling condenser 12p and to ground through a fixed resistance 13b. The cathode of the rectifier is connected through a fixed resistance 13c to the junction between a grounded fixed resistance 13d and a fixed resistance 13e connected to a positive power supply terminal 13f. The cathode of the rectifier is further connected through a coupling condenser 13g to variable amplitude pulse generator 14. It will be noted that fixed resistances 13d, 13e function as a voltage divider connected between positive terminal 13f and ground. Accordingly, a bias voltage is impressed upon the cathode of the rectifier tube through fixed resistance 13c. Due to the bias and rectifying action of the tube, the filtered signals are rectified and only signals of greater than a predetermined magnitude are passed to the pulse generator 14. The bias is adjusted through proper selection of the resistance 13d, 13e so that only detonation components are passed by the circuit, the low pressure wave and other extraneous components being eliminated.

Pulse generator 14 includes a triode 14a, the control grid of which is connected to coupling condenser 13g and to ground through a grid resistance 14b. The anode of the tube is connected directly to a positive power supply terminal 14c while the cathode is connected to ground through a tapped fixed resistance 14d shunted by a condenser 14e. The time constant of the resistance capacitance unit 14d, 14e is such that the sharp pulses produced by threshold device 13 are transformed into exponential pulses, that is, into pulses which decay more slowly than the sharp pulses produced by threshold device 13. Each exponential pulse, accordingly, has a greater energy content than the sharp pulse which produces it. Furthermore, the amplitude of the pulses is representative of the amplitude of the detonation in the cylinder which causes their production. To this end, the portion of fixed resistance 14d above the tap can have a value of two megohms, the portion below the tap can have a value of 24,000 ohms and condenser 14e can have a value of .02 mfd. Accordingly, the circuit has a time constant of approximately .04 second.

The exponential variable amplitude pulses are fed directly from the cathode of tube 14a to a coupling condenser 14f feeding the uniform pulse generator 15 and from the tap of resistance 14d to a coupling condenser 14g. The tapped connection is utilized to provide a lower input voltage for the succeeding pentode stage of amplifier 18.

The uniform pulse generator 15 preferably incorporates a multivibrator circuit having two triodes 15a, 15b. Signals from the generator 14 are fed to the control grid of triode 15b through a decoupling triode 15c. To this end, triode 15c has its control grid connected to coupling condenser 14f and to ground through a fixed resistance 15d. The cathode is connected to ground through a bias resistor 15e. The anode of triode 15c is connected to a positive power supply terminal 15f through fixed voltage dropping resistors 15g, 15h and to the control grid of triode 15b through a coupling condenser 15i. The anode of tube 15a is connected through a voltage dropping resistance 15j to the junction between fixed resistors 15h, 15g and to ground through a by pass condenser 15k. The anode of tube 15b is connected through the primary winding of an output transformer 15n and a fixed resistance 15o to positive power supply terminal 15f, a grounded by pass condenser 15p being connected to the junction between the last-mentioned components. The anode of tube 15b is also connected through a condenser 15q to the control grid of tube 15a. The control grid of tube 15a is connected to ground through a fixed resistance 15r while the control grid of tube 15b is connected through a fixed resistance 15s to a lead interconnecting the cathodes of tubes 15a and 15b, this lead being connected to ground through a bias resistor 15t shunted by a condenser 15u. The common cathode lead is also connected through a fixed resistance 15v to a positive power supply terminal 15w.

In operation, tube 15c feeds the variable amplitude pulses from generator 14 to the multivibrator but prevents the multivibrator output from returning through coupling condenser 14f to the main amplifier circuits. The circuit constants of the multivibrator are such that tube 15a is normally non-conductive while tube 15b is normally conductive. When a negative pulse passes through coupling condenser 15i to the control grid of tube 15b, as a result of tube 15c becoming conductive due to the presence at its control grid of a voltage from generator 14, tube 15b becomes non-conductive and its anode voltage abruptly increases, thereby producing a positive pulse at the anode of tube 15b and the primary winding of transformer 15n. This pulse is of constant amplitude and persists until tube 15b again becomes conductive. The described positive pulse at the anode of tube 15b is transmitted to the control grid of tube 15a through condenser 15q, causing tube 15a to become conductive. The resulting drop in anode voltage is transmitted to the control grid of tube 15b through condenser 15m, causing tube 15b to remain non-conductive until the charge on condenser 15m leaks away through resistance 15s, at which time tube 15b again becomes conductive and the original conditions are restored. Therefore, the duration of each uniform pulse is controlled by the time constant of the resistance-capacitance circuit 15m, 15s connected to the control grid of tube 15a and the multivibrator circuit produces at the anode of tube 15b a pulse of constant amplitude and constant duration each time a variable amplitude pulse is produced by generator 14.

Where the apparatus is used in connection with a detonation meter, suitable values for the circuit components are as follows:

| | | |
|---|---|---|
| Resistors 15r, 15s | megohms | 2 |
| Resistor 15t | ohms | 10,000 |
| Condenser 15m | mfd | .01 |
| Condenser 15q | mfd | .001 |
| Condenser 15u | mfd | 50 |

The output of uniform pulse generator 15 is fed through the transformer 15n to rectifier 16 and through a coupling condenser 15x to neon tube flasher circuit 21. With respect to rectifier 16, it will be noted that the cathode of the rectifier tube is connected to one terminal of the secondary winding of transformer 15n, the other terminal being grounded. The anode of rectifier tube 16 is connected to integrating circuit 17 which includes a series resistance 17a, two shunt condensers 17b, 17c and a voltage divider 17d, 17e connected in parallel with condenser 17c. The integrating circuit smooths out the fluctuations in the rectified voltage produced by unit 16. To this end, resistor 17a can have a value of 5,000,000 ohms and condensers 17b, 17c can each have a value of .5 mfd. The output of the integrating circuit appears at a lead 17f and is a direct negative voltage representing the average value of the uniform pulses produced by circuit 15.

It will be recalled that circuit 15 produces a uniform pulse each time a pulse is produced by generator 14. Therefore, the integrated rectified voltage of conductor 17f is proportional to the frequency of the pulses produced by threshold device 13 and generator 14. This direct negative voltage is applied to the control grid of a pentode 18a forming a part of amplifier 18 through a fixed resistance 18b. Signals are also impressed upon the control grid of this tube by coupling condenser 14g from the variable amplitude pulse generator 14. The operating voltages applied to the electrodes of tube 18a are such that the tube operates at a hyperbolic portion of its characteristic where the gain or amplification factor of the tube varies inversely as the negative bias voltage applied to its control grid. This is, of course, accomplished by proper selection of the voltages applied to the control electrodes of the tube. Where tube 18a is a type 6BA6 pentode, and a positive voltage of 255 volts is applied to a positive power supply terminal 18c, the anode of the tube should be connected to the power supply through a fixed resistance 18d having a value of 33,000 ohms and the screen grid of the tube should be connected to terminal 18c through a resistance 18e having a value of 100,000 ohms in order to obtain the proper potentials to cause tube 18a to operate at the desired portion of its characteristic curve.

Under these conditions, the signal fed through coupling condenser 14g is representative of the product of the pulse frequency and the amplitude of the pulses. Since the gain of the tube varies inversely as the pulse frequency, due to the negative bias voltage applied through resistance 18b, the output of the tube is representative only of the amplitude of the pulses produced by threshold device 13 and pulse generator 14.

It will be noted that the suppressor grid of tube 18a is connected directly to its cathode and that the screen grid is provided with a by pass condenser 18f. The anode of the tube is connected through a coupling condenser 18g to the control grid of an amplifier tube 18h which has a grounded grid resistance 18i. The anode of tube 18h is connected to positive power supply terminal 18c through a fixed resistance 18j and its cathode is connected directly to ground. The amplified output is withdrawn from tube 18h and passed through a coupling condenser 18k to the control grid of a triode 18m which has a grounded grid resistance 18n. The anode of tube 18m is connected directly to a positive power supply terminal 18p while its cathode is connected to ground through a load resistance 18q. Accordingly, an amplified voltage appears across the load resistor 18q which is proportional to the amplitude of the pulses produced by threshold device 13 and variable amplitude pulse generator 14 but independent of the frequency of occurrence of said pulses.

The voltage appearing across load resistance 18q is passed to integrating circuit 19 which includes series resistances 19a, 19b and shunt capacities 19c, 19d and 19e. This circuit smooths out the variations in the amplified voltage appearing across resistor 18q and produces an output which is representative of the average amplitude of the pulses but independent of their frequency. Resistances 19a, 19b can each have a value of 1 megohm, while condensers 19c, 19b and 19e can have values of .15 mfd., .5 mfd. and .25 mfd., respectively.

The output of the integrating circuit is passed to indicating device 20. This indicating circuit includes a triode 20a, the control grid receives the output of integrating circuit 19. The anode of tube 20a is connected to a positive power supply terminal 20b and its cathode is connected to ground through fixed resistances 20c and 20d. A meter 20e is connected between the junction of resistances 20c, 20d and the contactor of a potentiometer 20f which, in turn, forms a voltage divider together with the fixed resistance 20g, the voltage divider being connected between positive power supply terminal 20b and ground. It will be evident that the meter is connected in a bridge circuit and responds to the integrated voltage impressed upon tube 20a by circuit 19.

I have also provided a neon tube flasher circuit to produce a visual indication of each pulse. The flasher circuit 21 includes a triode 21a, the control grid of which is connected to coupling condenser 15x and to ground through a grid resistor 21b. The anode of the tube is connected through a voltage dropping resistor 21c to a positive power supply terminal 21d and the cathode of the tube is connected to one electrode of a gaseous discharge device 21e, such as a neon tube, the other electrode of the tube being grounded. Each time that a variable amplitude pulse is produced by generator 14, a uniform pulse is produced by generator 15 which causes the control grid of tube 21a to become more positive. As a result, the tube 21a becomes conductive and a flash is produced by neon tube 21e. In this manner, each pulse passing through the circuit produces a visual indication.

The circuit of Figure 2 also includes a power supply 22. This unit has the usual power transformer 22a with a switch 22b and fuse 22c in its primary circuit. The power supply further includes a dual diode rectifier 22d, series filter inductances 22e and 22f, filter condensers 22g and 22h, and a pair of voltage regulator tubes 22i and 22j, a fixed resistance 22k being connected in parallel with regulator tube 22i. A relatively high positive voltage is thereby impressed upon a lead 22m which supplies positive terminals 12e, 14c, 15f and 18c. A smaller positive voltage is impressed upon a lead 22n which supplies voltage to positive terminals 13f, 15w, 18p, 20b and 21d.

It will be apparent that I have achieved the objects of my invention in providing an improved pulse measuring circuit particularly adapted for use in a detonation meter. The maintenance of the proper operating potentials of the tube 12a permits the effect of pulse frequency to be removed by proper adjustment of the direct voltage bias with the use of only a single tube, thereby eliminating the necessity for a number of additional circuit components to accomplish the same purpose. Furthermore, the neon tube flasher circuit provides a visual indication each time a pulse is transmitted through the circuit. The device is particularly useful in measuring the intensity of detonation in test engines when they are operated to such condition that knocking occurs only infrequently, for example, once every ten or fifteen cycles of cylinder operation.

While the invention has been described in connection with a present, preferred embodiment thereof, it is to be understood that this description is illustrative only and is not intended to limit the invention.

I claim:

1. In a circuit for measuring the average amplitude of a sequence of electrical pulses, in combination, a vacuum tube having an anode, a cathode, a control grid and a screen grid, means for applying operating potentials to said anode and said screen grid such that the tube operates at the portion of its characteristic where there is a hyperbolic relationship between gain and the direct voltage bias applied to said control grid, means for applying said pulses to said control grid, a multivibrator circuit including two electron tubes each having an anode, a cathode, and a control grid, a first resistance-capacitance network connecting the control grid of one electron tube to the anode of the other electron tube, a second resistance-capacitance network connecting the control grid of said other tube to the anode of said one tube, said networks being arranged so that a pulse applied to the control grid of one tube produces a pulse of constant amplitude and width at the anode of the other tube, means connecting said pulse applying means to the control grid of said one tube, means for integrating and rectifying the pulses produced at the anode of said other tube to provide a direct bias voltage proportional to the frequency of occurrence of said pulses and independent of their amplitude, and means for applying said direct voltage to said control grid of said vacuum tube.

2. In a circuit for measuring the average amplitude of a sequence of electrical pulses, said pulses being representative of detonation in a cylinder of an internal combustion engine, which detonation occurs intermittently during a number of operating cycles of the engine, in combination, a vacuum tube having an anode, a cathode, a control grid and a screen grid, means for applying operating potentials to said anode and said screen grid such that the tube operates at the portion of its characteristic where there is a hyperbolic relationship between gain and the direct voltage bias applied to said control grid, means for applying said pulses to said control grid, a multivibrator circuit including two electron tubes each having an anode, a cathode, and a control grid, a first resistance-capacitance network connecting the control grid of one electron tube to the anode of the other electron tube, a second resistance-capacitance network connecting the control grid of said other tube to the anode of said one tube, said networks being arranged so that a pulse applied to the control grid of one tube produces a pulse of constant amplitude and width at the anode of the other tube, means connecting said pulse applying means to the control grid of said one tube, means for integrating and rectifying the pulses produced at the anode of said other tube to provide a direct bias voltage proportional to the frequency of occurrence of said pulses and independent of their amplitude, and means for applying said direct voltage to said control grid of said vacuum tube.

References Cited in the file of this patent

UNITED STATES PATENTS

| | | |
|---|---|---|
| 2,066,528 | Harper | Jan. 5, 1937 |
| 2,275,675 | Draper et al. | Mar. 10, 1942 |
| 2,291,045 | Lancor et al. | July 28, 1942 |
| 2,441,957 | De Rosa | May 25, 1948 |
| 2,534,004 | De Boisblanc | Dec. 12, 1950 |
| 2,557,636 | Crumrine | June 19, 1951 |
| 2,562,476 | Rado | July 31, 1951 |
| 2,638,811 | Williams, Jr. | May 19, 1953 |